US009219822B2

(12) United States Patent
Baccay et al.

(10) Patent No.: US 9,219,822 B2
(45) Date of Patent: Dec. 22, 2015

(54) SYSTEM AND METHOD FOR UPDATING A CONTACT LIST

(75) Inventors: Peter Eymard Baccay, San Jose, CA (US); Irina Mikheyenok, Castro Valley, CA (US); Mary Elaine Rabonza, Fairfield, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/228,628

(22) Filed: Sep. 9, 2011

(65) Prior Publication Data

US 2013/0065568 A1 Mar. 14, 2013

(51) Int. Cl.
*H04M 3/56* (2006.01)
*H04L 29/06* (2006.01)
*H04N 7/15* (2006.01)

(52) U.S. Cl.
CPC ........... *H04M 3/567* (2013.01); *H04L 65/4038* (2013.01); *H04N 7/15* (2013.01); *H04M 2203/5081* (2013.01); *H04M 2250/62* (2013.01)

(58) Field of Classification Search
CPC ............ H04L 65/4061; H04L 65/4038; H04L 12/1822; H04L 12/189; H04W 4/02; H04W 4/023; H04W 4/025; H04W 8/12; H04W 4/06; H04W 4/10; H04W 76/005; H04W 4/08; H04W 8/186
See application file for complete search history.

(56) References Cited

U.S. PATENT DOCUMENTS

| | | | |
|---|---|---|---|
| 5,717,863 A | 2/1998 | Adamson et al. | |
| 6,236,854 B1 | 5/2001 | Bradshaw, Jr. | |
| 6,856,809 B2 | 2/2005 | Fostick | |
| 6,944,646 B2 | 9/2005 | Iwao | |
| 6,959,074 B2 | 10/2005 | Berstis | |
| 7,299,257 B2 * | 11/2007 | Boyer | G06Q 10/107 709/204 |
| 7,492,887 B1 * | 2/2009 | Stumer | H04M 3/42 379/207.12 |
| 7,599,704 B2 * | 10/2009 | Yoon | H04W 4/10 370/276 |
| 7,647,375 B1 | 1/2010 | Fletcher | |
| 7,809,392 B2 * | 10/2010 | Rahkonen | H04M 1/274516 455/415 |
| 7,813,725 B2 | 10/2010 | Celik | |
| 2003/0119540 A1 * | 6/2003 | Mathis | H04M 3/42365 455/518 |
| 2003/0158864 A1 | 8/2003 | Samn | |
| 2005/0014490 A1 | 1/2005 | Desai et al. | |

(Continued)

FOREIGN PATENT DOCUMENTS

JP 2009-86900 4/2009

OTHER PUBLICATIONS

Extended European Search Report for Application No. 11180724.4-1237, dated Jan. 23, 2012 (7 pages).

(Continued)

*Primary Examiner* — Matthew Sams
(74) *Attorney, Agent, or Firm* — Fish & Richardson P.C.

(57) ABSTRACT

Presented are systems and methods for updating a contact list on a mobile device. A mobile device receives a conference call roster providing a plurality of conference call attendees participating on a conference call before or after joining a conference call. The mobile device determines, while participating on the conference call, contact information for a conference call attendee by querying a remote contact information database storing contact information of the plurality of conference call attendees. The mobile device receives, while participating on the conference call, contact information for the conference call attendee. The mobile device populates a contact information record with the received contact information.

20 Claims, 9 Drawing Sheets

(56) References Cited

U.S. PATENT DOCUMENTS

| | | | |
|---|---|---|---|
| 2005/0053220 A1 | 3/2005 | Helbling et al. | |
| 2005/0143135 A1* | 6/2005 | Brems | H04M 1/2745 455/564 |
| 2005/0238156 A1* | 10/2005 | Turner | H04L 12/1818 379/202.01 |
| 2006/0120308 A1* | 6/2006 | Forbes | H04M 3/42042 370/260 |
| 2006/0276179 A1* | 12/2006 | Ghaffari | H04Q 3/0033 455/412.2 |
| 2007/0047715 A1* | 3/2007 | Madhusudan | H04M 3/56 379/202.01 |
| 2007/0280464 A1* | 12/2007 | Hughes | H04M 7/003 379/205.01 |
| 2008/0056208 A1* | 3/2008 | Hinrikus | H04L 12/5692 370/338 |
| 2008/0070553 A1* | 3/2008 | Yamakawa | H04M 1/72522 455/413 |
| 2008/0117838 A1* | 5/2008 | Yee et al. | 370/260 |
| 2009/0111441 A1* | 4/2009 | Monaco | H04M 3/4935 455/415 |
| 2009/0181648 A1* | 7/2009 | Bao | H04M 3/42323 455/414.1 |
| 2010/0105437 A1 | 4/2010 | Lee et al. | |
| 2011/0244838 A1* | 10/2011 | Chang | H04M 1/274516 455/414.1 |
| 2011/0294481 A1* | 12/2011 | Nzumafo | 455/417 |

OTHER PUBLICATIONS

Canadian Office Action in Canadian Application No. 2,788,920, dated Aug. 13, 2014, 2 pages.

* cited by examiner

SYSTEM AND METHOD FOR UPDATING A CONTACT LIST

FIELD

Example embodiments relate to systems and methods for updating a contact list, and in particular to systems and methods for updating a contact list of a mobile device.

BACKGROUND

Mobile devices such as cellular phones, personal data assistant devices, portable computers, etc. are becoming ubiquitous recently. These mobile devices are used to communicate with other mobile devices, personal computers, and servers through a wireless network. Particularly, mobile devices are being used to talk; receive and send text messages and emails; make reservations to hotels, rental cars, or tickets; create and record appointments; play video games; or watch TV or movies. The adoption of these mobile devices in everyday life gives great convenience to users.

Recently, mobile devices are increasingly being used to participate in audio or video conference calls.

BRIEF DESCRIPTION OF THE DRAWINGS

Reference will now be made, by way of example, to the accompanying drawings which show example embodiments of the present disclosure, and in which.

DESCRIPTION OF EXAMPLE EMBODIMENTS

The example embodiments below describe systems and methods where a user using a mobile device participates in a conference call.

After receiving a conference call attendee list, a mobile device determines, while in the conference call, whether contact information of the attendees is stored in the mobile device. If contact information of one of the attendees is not stored locally, the mobile device provides an option for a user of the mobile device to retrieve the contact information. In some embodiments, the mobile device provides an option for a user of the mobile device to retrieve updated contact information even if the contact information of the attendee is stored locally in a memory of the mobile device. In some embodiments, a conference call moderating device is configured to approve a request from the mobile device for retrieving the contact information. If the request is approved, the mobile device receives, while participating on the conference call, contact information for the conference call attendees from a remote contact information database that includes a plurality of contact information records including the contact information of the conference call attendee. The mobile device can then create a contact information record corresponding to the received contact information, and populate the contact information record in the mobile device. In some embodiments, the mobile device provides an option to the user to save the contact information record to a memory coupled with the mobile device.

Figure 1:
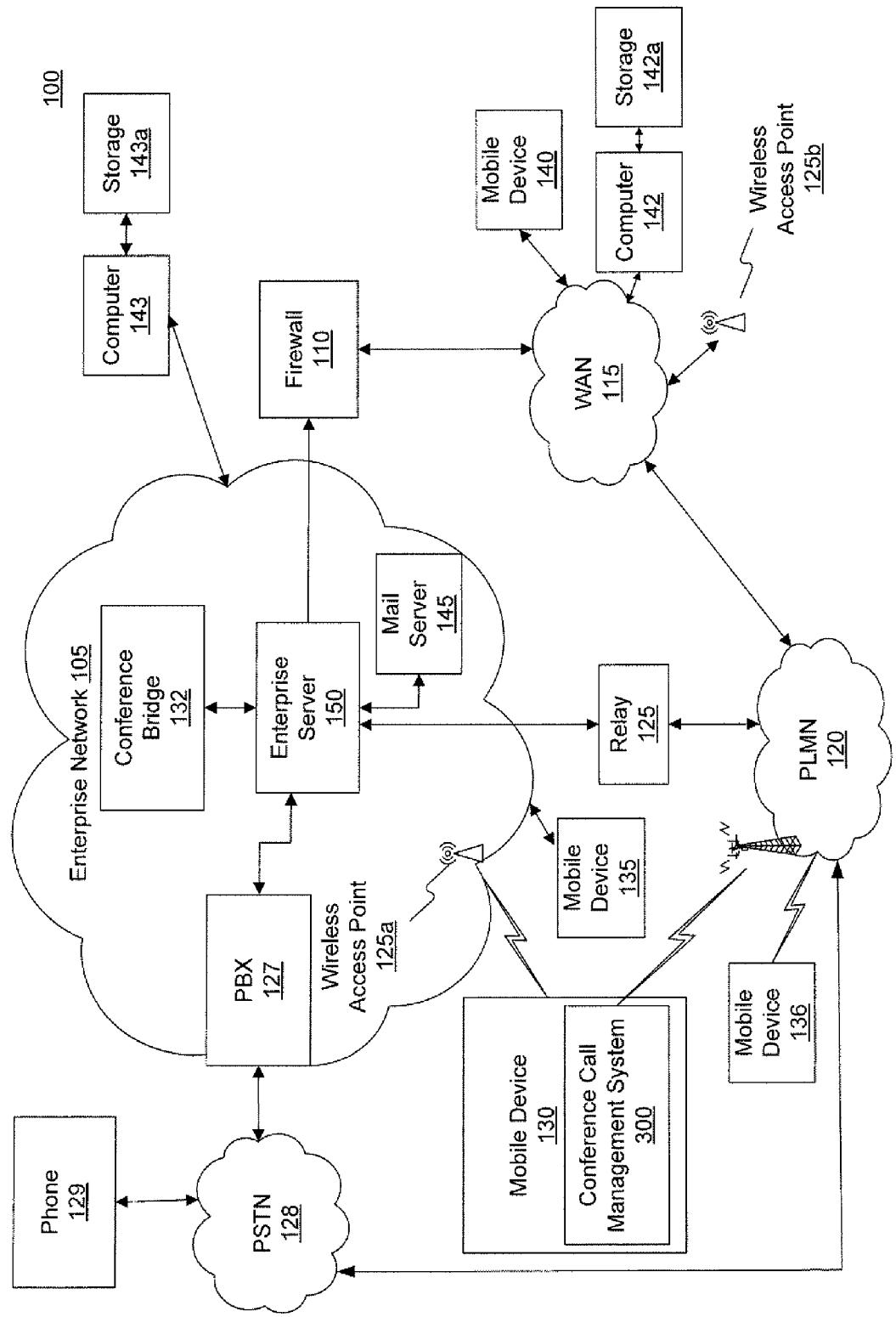
FIG. 1 shows, in block diagram form, an example system according to an example embodiment.

Reference is now made to FIG. 1, which shows, in block diagram form, an example system 100 in which a plurality of devices are used to participate in a conference call. System 100 includes an enterprise network 105, which in some embodiments includes a local area network (LAN). In some embodiments, enterprise network 105 can be an enterprise or business system. In some embodiments, enterprise network 105 includes more than one network and is located in multiple geographic areas. While FIG. 1 illustrates system 100 using an enterprise network 105, any type of network can be used so long as it can accommodate the conference call management system described herein.

Enterprise network 105 is coupled, often through a firewall 110, to a wide area network (WAN) 115, such as the Internet. Enterprise network 105 can also be coupled to a public switched telephone network (PSTN) 128 via direct inward dialing (DID) trunks or primary rate interface (PRI) trunks.

Enterprise network 105 can also communicate with a public land mobile network (PLMN) 120, which is also referred to as a wireless wide area network (WWAN) or, in some cases, a cellular network. The connection with PLMN 120 is via a relay 125.

In some embodiments, enterprise network 105 provides a wireless local area network (WLAN), not shown, featuring wireless access points, such as wireless access point 125a. In some embodiments, other WLANs can exist outside enterprise network 105. For example, a WLAN coupled to WAN 115 can be accessed via wireless access point 125b. WAN 115 is coupled to one or more mobile devices, for example mobile device 140. Additionally, WAN 115 can be coupled to one or more desktop or laptop computers 142 (one shown).

System 100 can include a number of mobile devices, for example, mobile devices 130, 135, 136, and 140. Mobile devices 130, 135, 136, and 140 can include devices equipped for cellular communication through PLMN 120, mobile devices equipped for Wi-Fi communications over one of the WLANs via wireless access points 125a or 125b, or dual-mode devices capable of both cellular and WLAN communications. Wireless access points 125a or 125b can be configured to WLANs that operate in accordance with one of the IEEE 802.11 specifications. In some embodiments, the memory stores user-profile information, including unique device identifiers, for example a device personal identification number (PIN), user identifier, place of employment, location data, work phone number, home address, etc. Additionally, the memory can store information relating to various people, for example, name of a user, a user's identifier (user name, email address, or any other identifier), place of employment, location data, work phone number, home address, device PIN, or the like.

Mobile devices 130, 135, 136, and 140 can be, for example, cellular phones, smartphones, tablets, netbooks, and a PDA (personal digital assistant) enabled for wireless communication. Moreover, mobile devices 130, 135, 136, and 140 can communicate with other components using voice communications or data communications (such as accessing content from a website). Mobile devices 130, 135, 136, and 140 are described in detail below in FIG. 2.

Mobile devices 130, 135, 136, and 140 also include one or more radio transceivers and associated processing hardware and software to enable wireless communications with PLMN 120, and/or one of the WLANs via wireless access points 125a or 125b. In various embodiments, PLMN 120 and mobile devices 130, 135, 136, and 140 are configured to operate in compliance with any one or more of a number of wireless protocols, including GSM, GPRS, CDMA, EDGE, UMTS, EvDO, HSPA, 3GPP, or a variety of others. It will be appreciated that mobile devices 130, 135, 136, and 140 can roam within PLMN 120 and across PLMNs, in known manner, as their user moves. In some instances, dual-mode mobile devices 130, 135, 136, and 140 and/or enterprise network 105 are configured to facilitate roaming between PLMN 120 and a wireless access point 125a or 125b, and are thus capable of seamlessly transferring sessions (such as voice calls) from a connection with the cellular interface of dual-mode device (i.e., 130, 135, 136, and 140) to a WLAN interface of the dual-mode device, and vice versa.

Enterprise network 105 typically couples to a number of servers, computers, and other devices. For example, in some embodiments, enterprise network 105 operatively connects one or more desktop or laptop computers 142 (one shown), 143 (one shown). The operative connection can be wired or wireless in some embodiments. In some embodiments, computers 142 and 143 are servers.

Computers 142 and 143 can include one or more processors (not shown), a memory (not shown), a data interface (not shown), and storages 142a, 143a. The processor(s) can be a single or multiple microprocessors, field programmable gate arrays (FPGAs), or digital signal processors (DSPs) capable of executing particular sets of instructions. Computer-readable instructions can be stored on a tangible nontransitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory.

In some embodiments, enterprise network 105 includes one or more mail servers, such as mail server 145, for coordinating the transmission, storage, and receipt of electronic messages, including conference call invitations, for client devices operating within enterprise network 105. Typical mail servers include the Microsoft Exchange Server™ and the IBM Lotus Domino™ server. Each user within the enterprise typically has at least one user account within the enterprise network 105. Associated with each user account is message address information, such as an e-mail address, user name, or the like. Messages addressed to a user message address are stored on the enterprise network 105 in mail server 145. The messages can be retrieved by the user using a messaging application, such as an email client application. In some embodiments, the messaging application operates on mobile devices 130, 135, and 136 coupled to enterprise network 105 within the enterprise. Using the messaging application, the user composes and sends messages addressed to others, within or outside enterprise network 105. The messaging application causes mail server 145 to send a composed message to the addressee, often via WAN 115.

Relay 125 serves to route messages received over PLMN 120 from mobile device 130 to the corresponding enterprise network 105. Relay 125 also pushes messages from enterprise network 105 to mobile device 130 via PLMN 120.

Enterprise network 105 can also include an enterprise server 150. Together with relay 125, enterprise server 150 functions to redirect or relay incoming e-mail messages addressed to a user's e-mail address through enterprise network 105 to mobile device 130 and to relay incoming e-mail messages composed and sent via mobile device 130 out to the intended recipients within WAN 115 or elsewhere. Enterprise server 150 and relay 125 together facilitate a "push" e-mail service for mobile device 130, enabling the user to send and receive e-mail messages using mobile device 130 as though the user were coupled to an e-mail client within enterprise network 105 using the user's enterprise-related e-mail address, for example on computer 143.

Enterprise network 105 can include a Private Branch eXchange ("PBX"; although in various embodiments the PBX can be a standard PBX or an IP-PBX for simplicity the description below uses the term PBX to refer to both) 127 having an operative connection with PSTN 128 for routing incoming and outgoing voice calls for the enterprise. PBX 127 is coupled to PSTN 128 via DID trunks or PRI trunks, for example. PBX 127 can use ISDN signaling protocols for setting up and tearing down circuit-switched connections through PSTN 128 and related signaling and communications. In some embodiments, PBX 127 can be coupled to one or more conventional analog telephones 129. PBX 127 is also coupled to enterprise server 150 and, through it, to telephone terminal devices, such as digital telephone sets (not shown), softphones operating on computers 143, etc. Within an enterprise, each individual can have an associated extension number, sometimes referred to as a PNP (private numbering plan), or direct dial phone number. Calls outgoing from PBX 127 to PSTN 128 or incoming from PSTN 128 to PBX 127 are typically circuit-switched calls. Within the enterprise, for example, between PBX 127 and terminal devices, voice calls are often packet-switched calls, for example Voice-over-IP (VoIP) calls.

System 100 includes one or more conference bridges 132. Conference bridge 132 can be part of enterprise network 105. Additionally, in some embodiments, conference bridge 132 can be accessed via WAN 115 or PTSN 128. Conference bridge 132 is implemented on one or more servers having suitable communications interfaces for operatively connecting to and communicating with enterprise server 150. Conference Bridge 132 can include one or more processors (not shown), a memory (not shown), and a data interface (not shown). The processor(s) can be a single or multiple microprocessors, field programmable gate arrays (FPGAs), or digital signal processors (DSPs) capable of executing particular sets of instructions. Computer-readable instructions can be stored on a tangible nontransitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. In some embodiments, the memory stores user-profile information, including unique device identifiers, for example a device personal identification number (PIN). Additionally, the memory can store information relating to various conference call attendees, for example, name of an attendee, an attendee's identifier (user name, email address, or any other identifier), location data, place of employment, work phone number, home address, device PIN, etc.

Mobile device 130 has a conference call management system 300 and is in communication with enterprise network 105. In some example embodiments, conference call management system 300 also operates on mobile devices 135, 136, and 140, or computers 142 and 143. In some embodiments, conference call management system 300 is in communication with and operates as part of a larger conference call program installed on mobile devices 130, 135, 136, and 140, and other servers on the enterprise network 105, for example, conference bridge 132.

Figure 2:
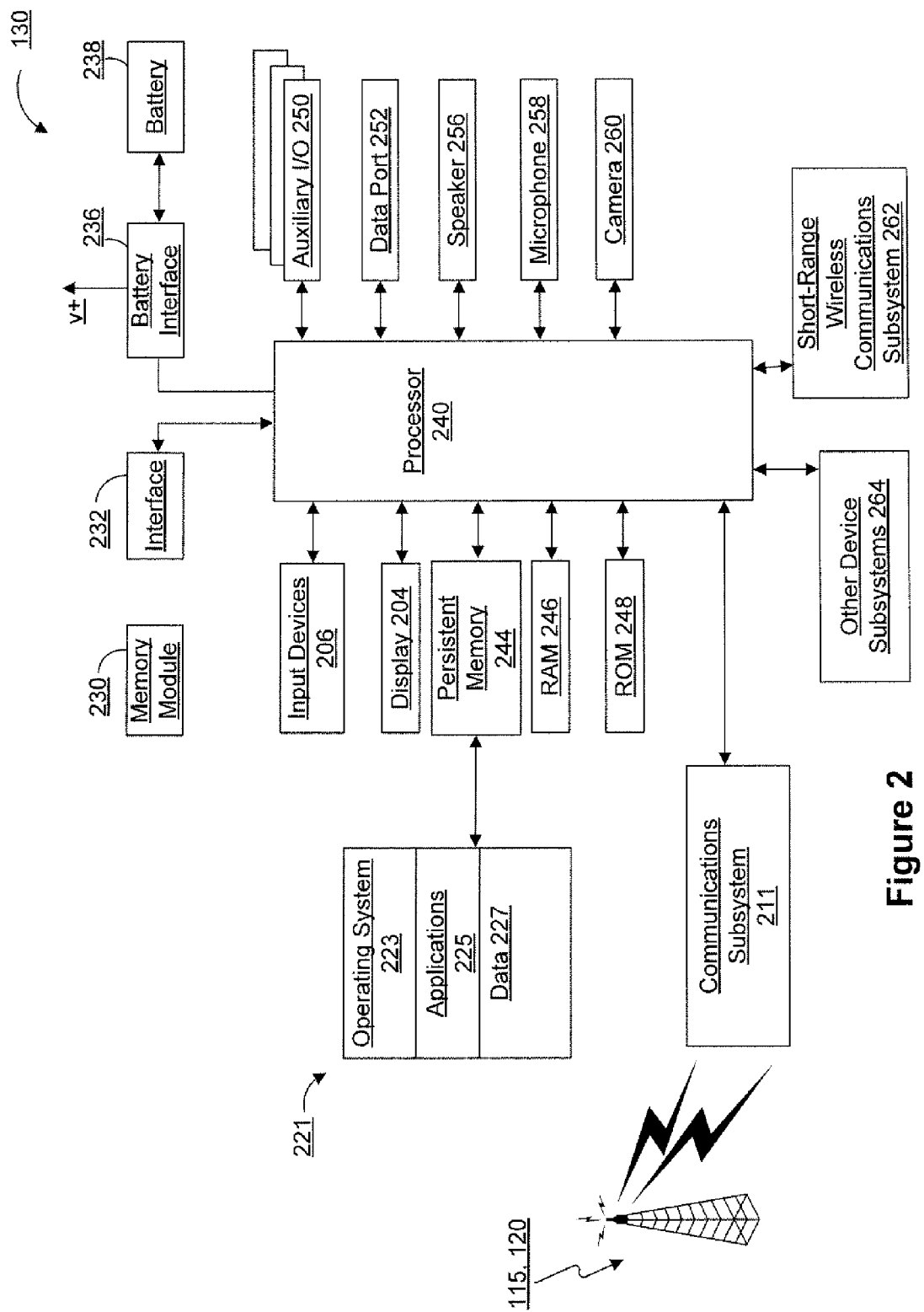
FIG. 2 shows a block diagram illustrating a mobile device according to an example embodiment.

Reference is now made to FIG. 2 illustrating in detail mobile device 130 in which example embodiments can be applied. Note that while FIG. 2 is described in reference to mobile device 130, it can also apply to mobile devices 135, 136, and 140. Mobile device 130 is a two-way communication device having data and voice communication capabilities, and the capability to communicate with other computer systems, for example, via the Internet. Depending on the functionality provided by mobile device 130, in various embodiments mobile device 130 can be a handheld device, a multiple-mode communication device configured for both data and voice communication, a smartphone, a mobile telephone, a tablet, a netbook, a gaming console, or a PDA (personal digital assistant) enabled for wireless communication.

Mobile device 130 includes a rigid case (not shown) housing the components of mobile device 130. The internal components of mobile device 130 can, for example, be constructed on a printed circuit board (PCB). The description of mobile device 130 herein mentions a number of specific components and subsystems. Although these components and subsystems can be realized as discrete elements, the functions of the components and subsystems can also be realized by integrating, combining, or packaging one or more elements in any suitable fashion.

Mobile device 130 includes a controller comprising at least one processor 240 (such as a microprocessor), which controls the overall operation of mobile device 130. Processor 240 interacts with device subsystems such as a communications subsystem 211 for exchanging radio frequency signals with the wireless network (for example WAN 115 and/or PLMN 120) to perform communication functions. Processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, one or more cameras 260 (one shown), short-range wireless communications subsystem 262 (which can employ any appropriate wireless such as RF, optical, or other short range communications technology), and other device subsystems generally designated as 264. Some of the subsystems shown in FIG. 2 perform communication-related functions, whereas other subsystems can provide "resident" or on-device functions.

Display 204 can be realized as a touch-screen display in some embodiments. The touch-screen display can be constructed using a touch-sensitive input surface coupled to an electronic controller and which overlays the visible element of display 204. The touch-sensitive overlay and the electronic controller provide a touch-sensitive input device, and processor 240 interacts with the touch-sensitive overlay via the electronic controller.

Communications subsystem 211 includes one or more communication systems for communicating with wireless WAN 115 and wireless access points 125a and 125b within the wireless network. The particular design of wireless communications subsystem depends on the wireless network in which mobile device 130 is intended to operate. Mobile device 130 can send and receive communication signals over the wireless network after the required network registration or activation procedures have been completed.

Processor 240 operates under stored program control and executes software modules 221 stored in memory such as persistent memory 244 or ROM 248. Processor 240 can execute code means or instructions. ROM 248 can contain data, program instructions or both. Persistent memory 244 can contain data, program instructions or both, in some embodiments is rewritable under control of processor 240, and can be realized using any appropriate persistent memory technology, including EEPROM, EAROM, FLASH, and the like. As illustrated in FIG. 2, software modules 221 can include operating system software 223. Additionally, software modules 221 can include software applications 225.

In some embodiments, persistent memory 244 stores user profile information, including a device PIN. Persistent memory 244 also can store information relating to various people, for example, name of a user, a user's identifier (user name, email address, or any other identifier, device PIN), place of employment, work phone number, home address, etc. Persistent memory 244 can additionally store contact information related to conference call attendees and any related grouping information.

Software modules 221, for example, conference call management system 300, or parts thereof can be temporarily loaded into volatile memory such as RAM 246. RAM 246 is used for storing runtime data variables and other types of data or information. In some embodiments, different assignment of functions to the types of memory could also be used.

Software applications 225 can further include a range of applications, including, for example, an application related to a conference call application, e-mail messaging application, address book, calendar application, notepad application, internet browser application, voice communication (i.e., telephony) application, mapping application, or a media player application, or any combination thereof. Each of software applications 225 can include layout information defining the placement of particular fields and graphic elements (for example, text fields, input fields, icons, or the like) in the user interface (for example, display 204) according to the disclosure.

In some embodiments, auxiliary input/output (I/O) subsystems 250 comprise an external communication link or interface, for example, an Ethernet connection. In some embodiments, auxiliary I/O subsystems 250 can further comprise one or more input devices, including a pointing or navigational tool such as a clickable trackball or scroll wheel or thumbwheel, or one or more output devices, including a mechanical transducer such as a vibrator for providing vibratory notifications in response to various events on mobile device 130 (for example, receipt of an electronic message or incoming phone call), or for other purposes such as haptic feedback (touch feedback).

In some embodiments, mobile device 130 also includes one or more removable memory modules 230 (typically comprising FLASH memory) and one or more memory module interfaces 232. Among possible functions of removable memory module 230 is to store information used to identify or authenticate a user or the user's account to wireless network (for example WAN 115 and/or PLMN 120). For example, in conjunction with certain types of wireless networks, including GSM and successor networks, removable memory module 230 is referred to as a Subscriber Identity Module (SIM).

Memory module 230 is inserted in or coupled to memory module interface 232 of mobile device 130 in order to operate in conjunction with the wireless network.

Mobile device 130 stores data 227 in persistent memory 244. In various embodiments, data 227 includes service data comprising information required by mobile device 130 to establish and maintain communication with the wireless network (for example WAN 115 and/or PLMN 120). Data 227 can include conference call management system 300 data used by mobile device 130 for various tasks. For example, data 227 can include user-profile information, including unique device identifiers, for example a device personal identification number (PIN). Additionally, the memory can store a list of contacts including contact information relating to various people, for example, name of a user, a user's identifier (user name, email address, or any other identifier), place of employment, work phone number, location information, home address, device PIN, or the like. In addition, the memory can store a list of contacts including various groups of people, for example, a group of relatives, friends, or colleagues, etc. Moreover, the memory can store a list of contacts including one or more ad hoc groups for particular purposes, for example, a "new product developing" group, or a "financial committee" group, etc.

Mobile device 130 also includes a battery 238 which furnishes energy for operating mobile device 130. Battery 238 can be coupled to the electrical circuitry of mobile device 130 through a battery interface 236, which can manage such functions as charging battery 238 from an external power source (not shown) and the distribution of energy to various loads within or coupled to mobile device 130. Short-range wireless communications subsystem 262 is an additional optional component that provides for communication between mobile device 130 and different systems or devices, which need not necessarily be similar devices. For example, short-range wireless communications subsystem 262 can include an infrared device and associated circuits and components, or a wireless bus protocol compliant communication mechanism such as a BLUETOOTH® communication module to provide for communication with similarly-enabled systems and devices.

A predetermined set of applications that control basic device operations, including data and possibly voice communication applications can be installed on mobile device 130 during or after manufacture. Additional applications and/or upgrades to operating system software 223 or software applications 225 can also be loaded onto mobile device 130 through the wireless network (for example, WAN 115 and/or PLMN 120), auxiliary I/O subsystem 250, data port 252, short-range wireless communications subsystem 262, or other suitable subsystem such as 264. The downloaded programs or code modules can be permanently installed, for example, written into the program memory (for example, persistent memory 244), or written into and executed from RAM 246 for execution by processor 240 at runtime.

Mobile device 130 can provide three principal modes of communication: a data communication mode, a voice communication mode, and a video communication mode. In the data communication mode, a received data signal such as a text message, an e-mail message, Web page download, or an image file are processed by communications subsystem 211 and input to processor 240 for further processing. For example, a downloaded Web page can be further processed by a browser application, or an e-mail message can be processed by an e-mail message messaging application and output to display 204. A user of mobile device 130 can also compose data items, such as email messages, for example, using the input devices in conjunction with display 204. These composed items can be transmitted through communications subsystem 211 over the wireless network (for example, WAN 115 and/or PLMN 120). In the voice communication mode, mobile device 130 provides telephony functions and operates as a typical cellular phone. In the video communication mode, mobile device 130 provides video telephony functions and operates as a video teleconference term. In the video communication mode, mobile device 130 utilizes one or more cameras 260 to capture video of video teleconference. In the video communication mode, call management system 300 can be a video conferencing server and can include a video control module (not shown) that controls the operation of camera 260 for participating in a video conference.

In system 100, a conference call can be managed by conference bridge 132, or can be managed by one of the computers 142, 143, or one of mobile devices 130, 135, 136, and 140, for example.

In the following, examples will be given as conference bridge 132 managing a conference call. Before beginning a conference call, conference bridge 132 sends invitations to potential conference call attendees through emails or text massages, for example. After receiving responses from these potential conference call attendees, conference bridge 132 can generate a conference call roster that includes the names of the attendees in the conference call. Conference bridge 132 can then send the conference call roster to each of the attendees. Note that conference bridge 132 can send the conference call roster to the attendees before or after the conference call begins.

Examples will now be given to how mobile devices 130, 135, 136, and 140 can update their contact lists stored locally at, for example, persistent memory 244 after receiving a conference call roster. Although the following examples are described in reference to mobile device 130, it also applies to mobile devices 135, 136, and 140.

Figure 3:
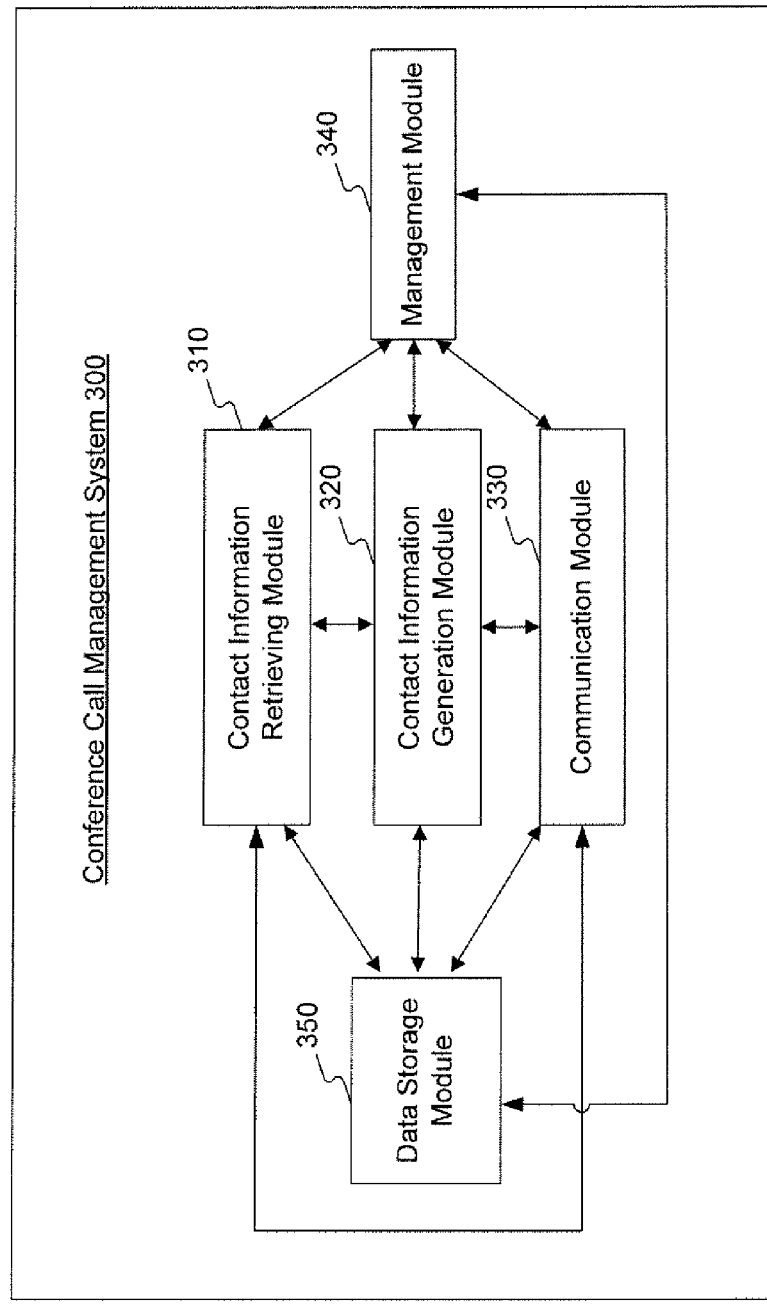
FIG. 3 is a block diagram depicting an example conference call management system.

FIG. 3 is a block diagram depicting example conference call management system 300 implemented on a mobile device, for example, mobile device 130, mobile device 135, mobile device 136, mobile device 140, computer 142, or computer 143. As illustrated, conference call management system 300 includes a contact information retrieving module 310, a contact information generation module 320, a communication module 330, a management module 340, and a data storage module 350. It is appreciated that one or more of these modules can be deleted, modified, or combined together with other modules.

Contact information retrieving module 310 can generate a request for contact information and send it to communication module 330. Communication module 330 sends the request to a remote device (such as conference bridge 132) that maintains a contact information database containing a plurality of contact information records. Communication module 330 is also configured to receive information from remote devices. For example, communication module 330 is configured to receive a conference call roster, or request contact information. After the requested contact information is received, contact information record generation module 320 generates contact information records based on the received contact information. Management module 340 is configured to populate the contact information records in mobile device 130. Data storage module 350 stores the contact information records in mobile device 130 at, for example, persistent memory 244.

In some embodiments, the received contact information can include updates to an attendee's contact information that was previously stored on mobile device 130. The received contact information can include only updates or can include both updates and contact information identical to the contact information stored on mobile device 130. Management module 340 is configured to update the previously stored contact information records in mobile device 130. Data storage module 350 stores the updated contact information.

Management module 340 can give instructions for displaying a list of conference call attendees, and can determine whether an attendee's contact information is stored locally. If management module 340 determines that the contact information is not stored locally, management module 340 can provide instructions for displaying a prompt to the user requesting whether to request that contact information. A video control module (not shown) can be included in the conference call management system 300 to control the operation of camera 260 when participating in a video conference.

In some embodiments, management module 340 can provide instructions for requesting contact information for an attendee having contact information already stored on mobile device 130. Management module 340 can compare the requested contact information with the stored contact information for determining whether to update the attendee's contact information. In some embodiments, management module 340 can provide instructions for transmitting the stored attendee's contact information, which can then be compared with contact information located at the remote location.

In some embodiments, the updates to the contact information occur automatically. In some other embodiments, management module 340 can provide instructions for displaying a prompt to the user requesting whether to update the attendee's contact information.

Figure 4B:
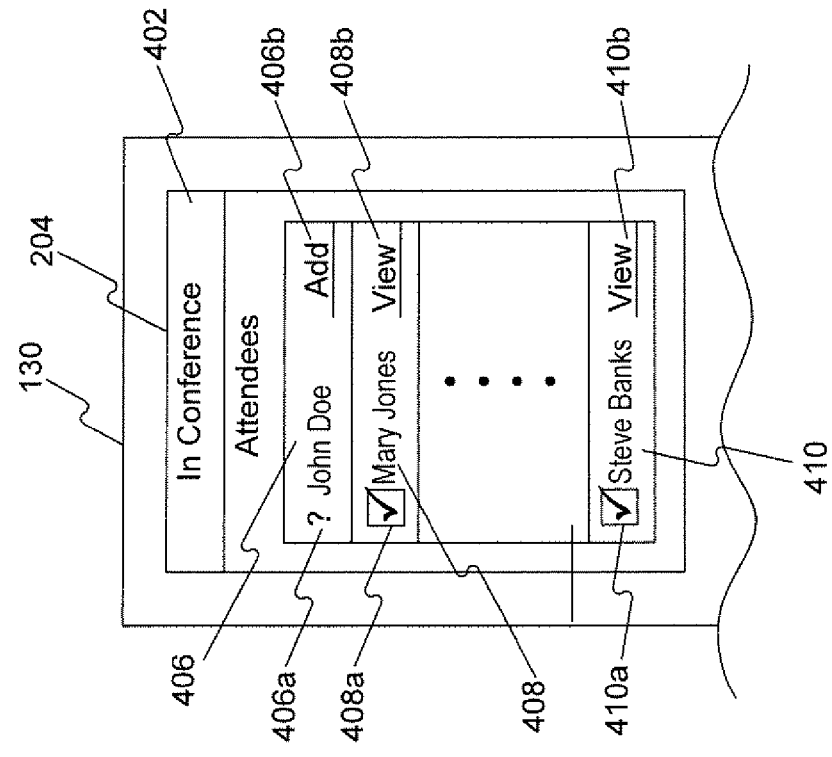
FIG. 4B illustrates an example display screen displaying an example conference call roster.
Figure 4A:
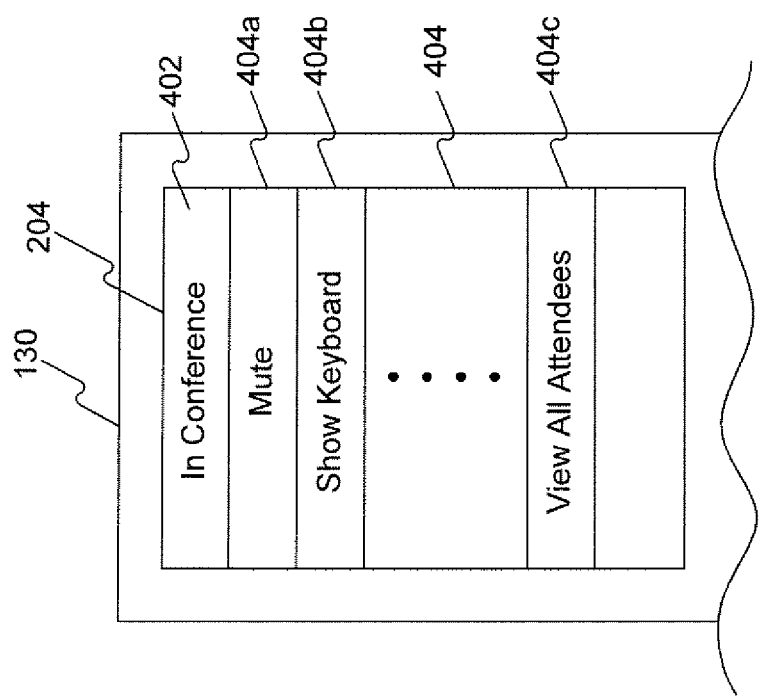
FIG. 4A illustrates an example display screen displaying example conference call menu items.

FIG. 4A depicts an example mobile device 130 displaying a screen shot of its participation in a conference call. In FIG. 4A, mobile device 130 includes a display 204, such as a graphical user interface, showing that mobile device 130 is in a status of "In Conference" 402. It can also display a menu, for example, presenting to the user one or more menu items for the conference call. For example, the menu items 404 can include "Mute" 404a, "Show Keyboard" 404b, or "View All Attendees" 404c. In some embodiments, the menu items 404 can be presented as icons. If the user selects "View All Attendees" link 404c, management module 340 of mobile device 130 can send instructions to a display module (not shown) for displaying a conference call roster including a list of names of the conference call attendees. Before sending the instructions for displaying, management module 340 checks (using data storage module 350) whether the contact information of the conference call attendees is stored locally at, for example, persistent memory 244.

FIG. 4B illustrates an example screen shot of mobile device 130 displaying a list of names of the conference call attendees. The list includes attendee names "John Doe" 406, "Mary Jones" 408, and "Steve Banks" 410, etc. In addition, the list can include indicators as to whether the contact information of the attendees is stored locally and available to be viewed according to the determination results from management module 340. For example, in FIG. 4B, a question mark "?" 406a adjacent to name "John Doe" 406 can indicate that the contact information of attendee "John Doe" is not stored locally in mobile device 130, while a checked box 408a or 410a can indicate that the contact information of attendees "Mary Jones" and "Steve Banks" is already stored locally in a memory of mobile device 130 and is available for viewing. In other example embodiments, the list also shows other attributes of the attendees, such as whether an attendee is on mute, in a private discussion with other attendees, etc.

If the contact information is not stored locally, the user of a mobile device 130 can request that the contact information of an attendee be added to a contact list of the mobile device 130. For example, in FIG. 4B, the contact information of "John Doe" is not stored locally and the user can select "Add" link 406b to add the contact information to the contact list of mobile device 130. The user can also request to view the contact information stored locally. For example, because the contact information of "Mary Jones" and "Steve Banks" is stored locally in mobile device 130, the user can select the "View" links 408b and 410b to view the respective contact information of "Mary Jones" and "Steve Banks".

Figure 4C:
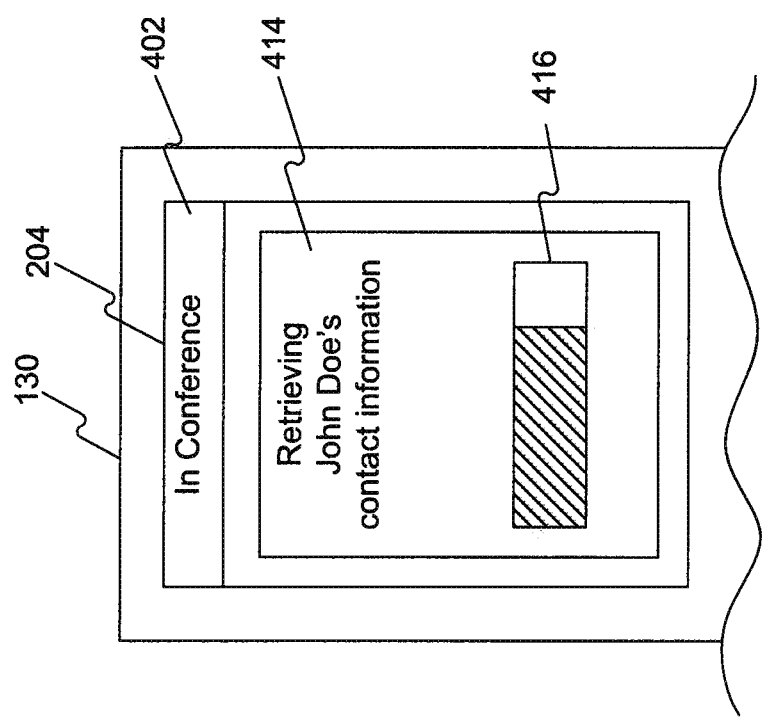
FIG. 4C illustrates an example display screen displaying an example application retrieving contact information.

If the user selects the "Add" link 406b, contact information retrieving module 310 of mobile device 130 generates a request to retrieve the contact information. Communication module 330 sends the request to a remote device, while still participating or preparing to participate in the conference call. For example, mobile phone 130 can send a request for the contact information to conference bridge 132, which manages the conference call. FIG. 4C illustrates an example screen shot of the mobile device 130 retrieving contact information of an attendee "John Doe" while still participating in the conference call. The mobile device 130 can display a text message, "Retrieving John Doe's contact information" 414 and a retrieving status bar 416 to show the progress of the retrieval.

After communication module 330 receives the requested contact information, contact information generation module 320 generates a new contact information record based on the received contact information. Management module 340, upon notification of the new contact information record, sends instructions for displaying the new contact information record to a display module (not shown), whereby the user can edit the contact information. FIG. 5A depicts an example of displaying a new contact information record 502 in a mobile device 130. The new contact information record 502 includes name of the person, title, position within an organization, email address, employer, place of employment, work phone number, location information, home address, PIN, etc. A functional dialogue block 504 that provides an option to save the new contact information record 502 can be displayed along with this new record.

Figure 5B:
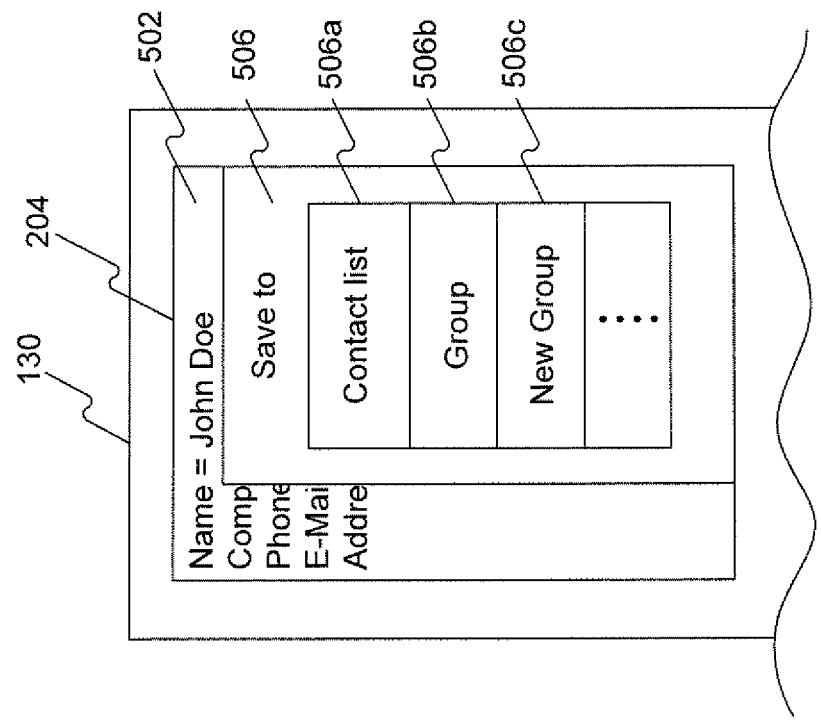
FIG. 5B illustrates an example display screen displaying saving options.
Figure 5A:
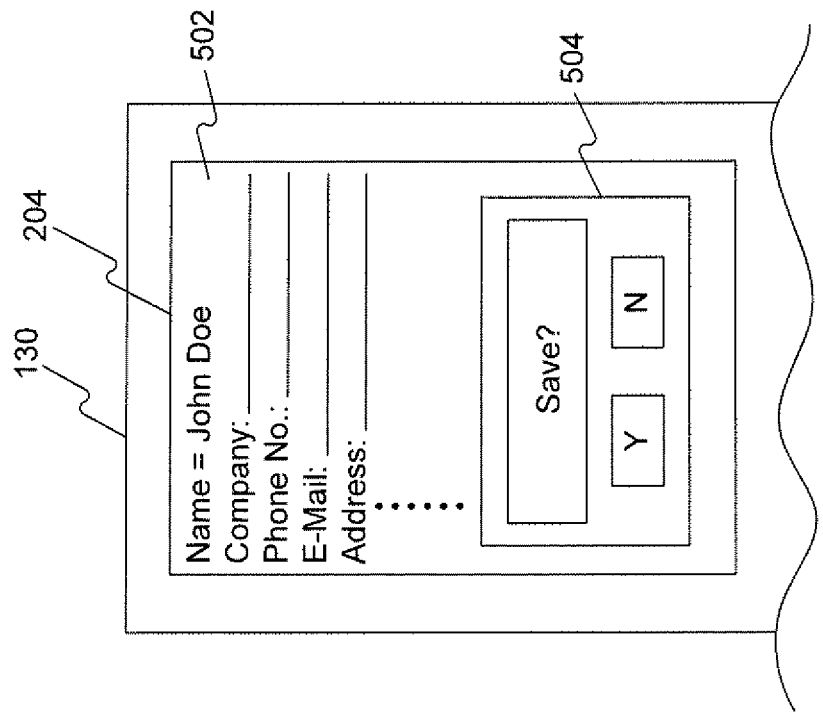
FIG. 5A illustrates an example display screen displaying a new contact information record.

Referring to FIG. 5B, in some embodiments, after the user agrees to save the new contact information record, the mobile device provides options to associate the contact with one or more groups. For example, the user can save the new record to an existing list of contacts by selecting 506a. In some embodiments, the user can save the new record to one or more existing groups by selecting 506b. The one or more existing groups can include one or more ad hoc groups, and the new contact information record can be associated with the one or more existing ad hoc groups, which can be automatically determined based on the conference call roster. In some embodiments, the user can create one or more new groups and save the new record to the one or more new groups by selecting 506c. The one or more new groups can include one or more new ad hoc groups, and the new contact information record can be associated with the one or more new ad hoc groups.

Figure 6:
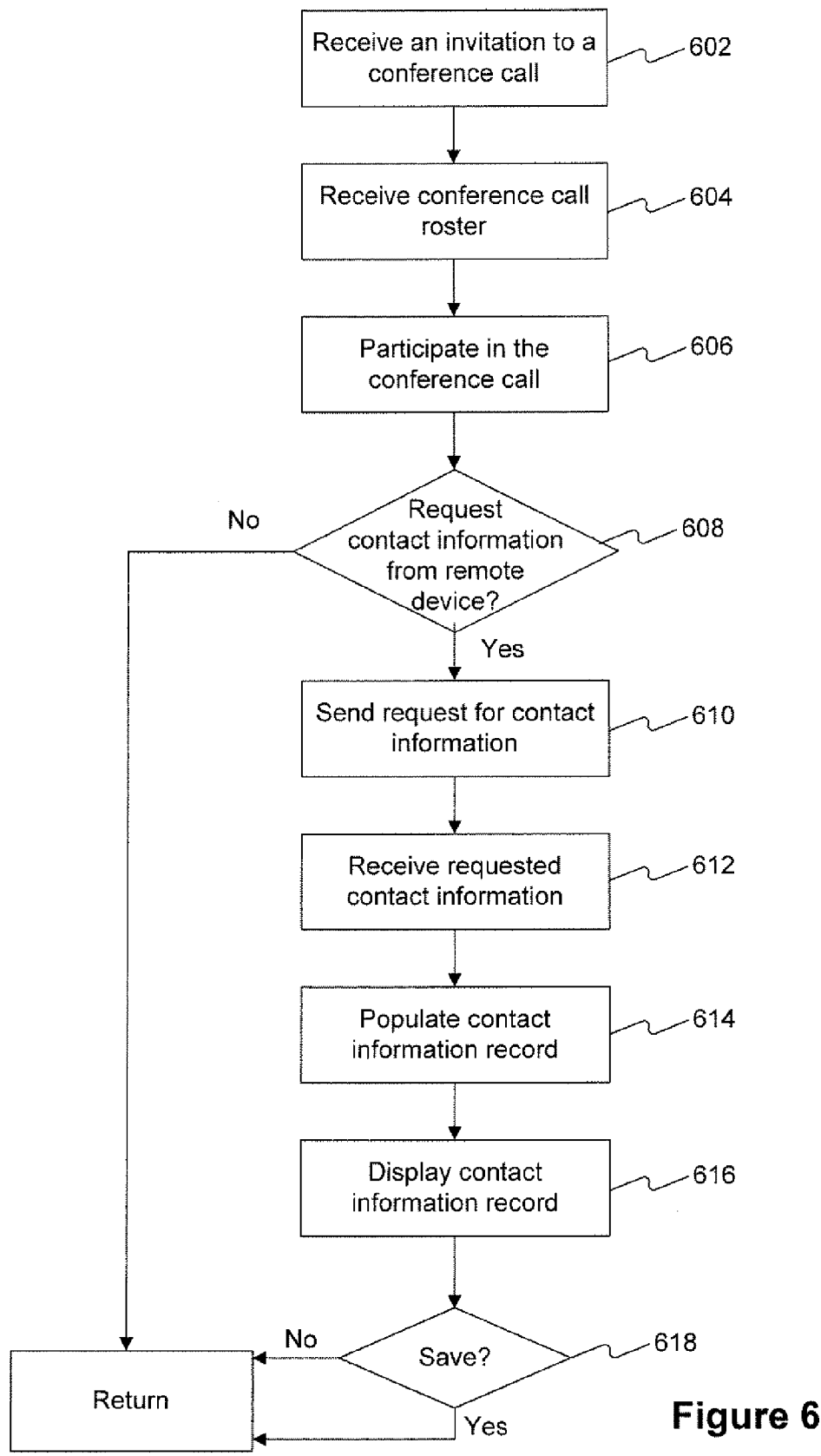
FIG. 6 shows a flowchart representing an example method for updating a contact list according to some embodiments.

FIG. 6 shows a flowchart representing an example method for updating a contact list according to some embodiments. While the flowchart discloses the following steps in a particular order, it is appreciated that at least some of the steps can be moved, modified, or deleted where appropriate.

At step 602, a mobile device (such as mobile device 130) receives an invitation to a conference call. After the invitation is accepted, the mobile device receives a conference call roster from a server, for example, conference bridge 132 at step 604. The conference call roster includes a plurality of conference call attendees participating on a conference call. In some embodiments, the mobile device receives both the conference call invitation at step 602 and the conference call roster at step 604 from the same transmission. For example, a conference invite email can include the conference call roster including the list of the conference call attendees. Note that the mobile device can receive the conference call roster before or after the conference call begins.

At step 606, the mobile device participates in the conference call by communicating with a server (such as conference bridge 132). The conference call can be an audio conference call, a video conference call, or a combination of both. For example, while in the conference call, the user of the mobile device can have an option to open the conference call roster, including the names of the attendees. In some embodiments, the user can request to see the corresponding contact information stored locally in the mobile device. The mobile device can display the conference call roster so that the user can see who is attending and can provide the user with the option of requesting contact information from an attendee listed on the conference call roster. At step 608, if it is determined that the contact information of one or more of the attendees is to be requested from a remote device (such as conference bridge 132 or computers 142, 143), the mobile device sends a request for contact information at step 610.

The requested contact information can include an attendee's contact information not stored locally on the mobile device, updates to the attendee's contact information already stored on the mobile device, or a combination of updates and contact information identical to the contact information stored on mobile device 130.

In some embodiments, step 608 further involves determining whether the contact information of one or more of the attendees is stored locally. If the contact information is stored locally, the mobile device can automatically request the contact information from the remote device, can prompt the user asking permission to request the contact information, or simply does not request the contact information since it is already stored in the mobile device.

After sending a request for contact information at step 610, the mobile device receives contact information from a remote contact information database at step 612. This contact information includes, for example, an email address, a PIN, a place of employment, a phone number, an address, or any combination thereof. The contact information database can be maintained in conference bridge 132 or computers 142, 143, for example.

At step 614, the mobile device populates the contact information record with at least some of the received contact information. In the embodiment where the contact information is contact information for an attendee not previously stored on the mobile device, the mobile device can create a new contact information record and populate the record with the received contact information. In the embodiments where the received contact information includes updates to contact information for an attendee previously stored on the mobile device, the mobile device can determine whether the received contact information includes updates, and updates the contact information record by populating the record with at least the updated contact information. In some embodiments, the updated or new items of the contact information record of an attendee previously stored on the mobile device can be highlighted (for example, with different colors or underlines) to distinguish the original contact information from the received contact information so that the user can be aware of what the updated or new items are.

This contact information can then be displayed on a display screen at step 616. In some embodiments, the mobile device receives instructions from the user to modify at least a portion of the contact information record. The mobile device determines whether to save the contact information record at step 618 according to an instruction from the user.

Figure 7:
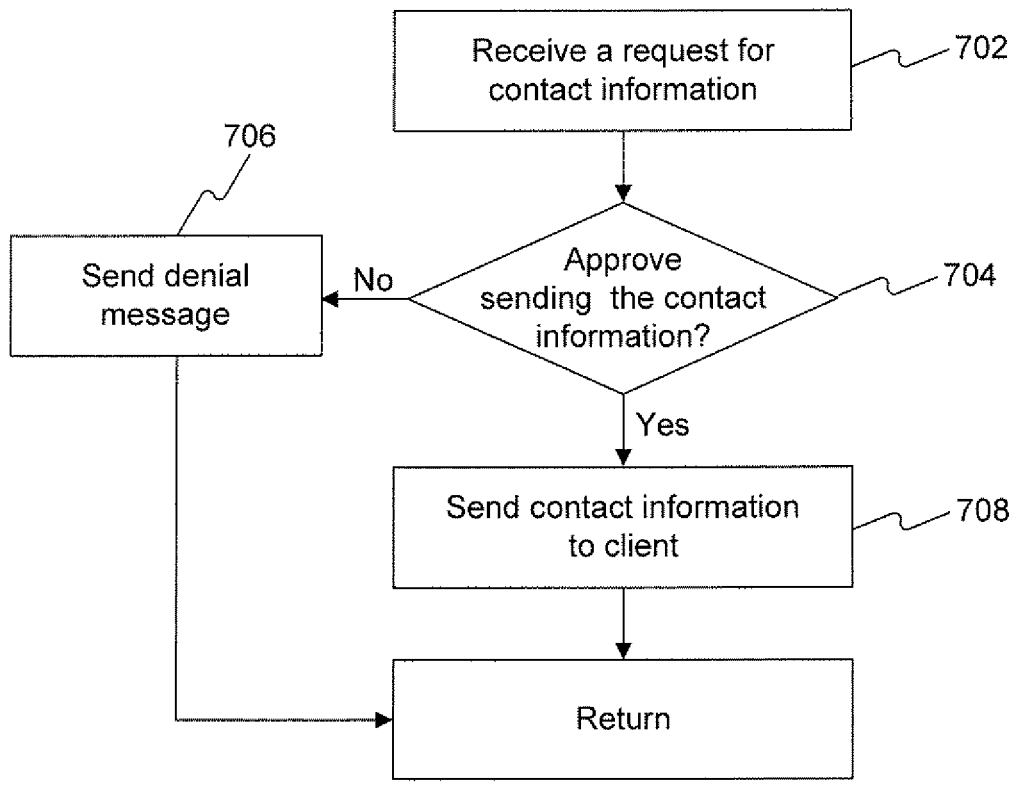
FIG. 7 shows a flowchart representing an example method for approving a request for retrieving contact information in a server.

FIG. 7 shows a flowchart representing an example method of a server, for example conference bridge 132, after receiving a request from a mobile device for retrieving contact information according to some embodiments. While the flowchart discloses the following steps in a particular order, it is appreciated that at least some of the steps can be moved, modified, or deleted where appropriate.

Figure 8:
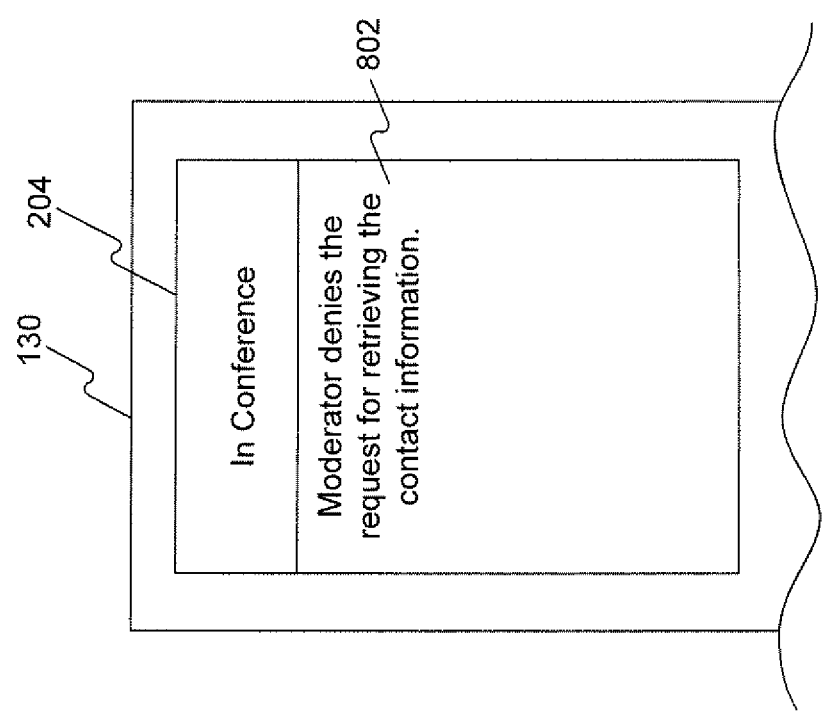
FIG. 8 illustrates an example display screen displaying an example denial message.

In step 702, a server managing the conference call receives the request for contact information of a conference call attendee. The server can in accordance with a predetermined rule, for example, determine whether to approve the request at step 704. In some other embodiments, the server can receive an instruction indicating whether the request should be approved, from a moderator of the conference call. The moderator of the conference call can use a moderating device (for example, mobile device 130, mobile device 135, mobile device 136, mobile device 140, computer 142, or computer 143) for hosting the call. In yet some other embodiments, the server does not perform approval step 704 and proceeds automatically to step 708. If the server determines not to approve the request, it sends a denial message back to the mobile device at step 706. On receipt of the denial message, a mobile device 130 displays a denial message. For example, mobile device 130 displays a denial message 802 as shown in FIG. 8.

On the other hand, if the server approves the request, the server sends the contact information to the requesting mobile device at step 708.

According to some example embodiments, a mobile device can send a contact information request to a server other than the server that manages the conference call. For example, referring back to FIG. 1, mobile device 130 can send a request for the contact information to computer 142, which does not manage the conference call but maintains a contact information database in its storage 142*a*. The contact information database contains a plurality of contact information records including the requested contact information of the conference call attendee. Each contact information record can include, for example, an email address, a PIN, a place of employment, a phone number, an address, etc. Computer 142, in response to the request, searches for, acquires, and sends the requested contact information back to mobile device 130. Because retrieving the contact information is without the involvement of the conference call managing server, the user of mobile device 130 can thus enjoy a broad flexibility in obtaining new contact information.

Certain adaptations and modifications of the described embodiments can be made. Therefore, the above discussed embodiments are considered to be illustrative and not restrictive.

Embodiments of the present disclosure are not limited to any particular operating system, mobile device architecture, server architecture, or computer programming language.

What is claimed is:
1. A method of updating a contact list on a mobile device, comprising:
    receiving, by the mobile device, a request to participate in a conference call;

in connection with receiving the request, receiving, by the mobile device, a conference call roster providing a plurality of conference call attendees participating on a conference call, wherein one or more conference call attendees can participate on the conference call via a full-duplex communication session;

sending, by the mobile device while participating on the conference call, a request for contact information of a first conference call attendee of the plurality of conference call attendees, wherein the contact information of the first conference call attendee is stored in a remote contact information database;

receiving, by the mobile device while participating on the conference call, contact information for the first conference call attendee based on a conference call moderating device determining whether to approve the request for the contact information of the first conference call attendee based on a predefined rule, wherein the predefined rule defines one or more types of requests to reject; and populating a contact information record with the received contact information.

2. The method of claim 1, further comprising:
creating the contact information record in the mobile device based on the received contact information of the first conference call attendee.

3. The method of claim 1, wherein the remote contact information database is associated with a first server, and the conference call is managed by a second server different from the first server.

4. The method of claim 1, further comprising:
adding the contact information record to a group of contacts or to an ad hoc group of contacts.

5. The method of claim 1, further comprising:
comparing the received contact information with first conference call attendee's contact information that was previously stored on the mobile device; and
updating the stored contact information of the contact information record based on the comparison.

6. The method of claim 1, wherein the conference call roster includes a first indicator indicating that contact information of the first conference call attendee is not stored in the mobile device.

7. The method of claim 6, wherein the conference call roster further includes a second indicator indicating that contact information of a second conference call attendee is stored in the mobile device.

8. The method of claim 1, wherein the conference call moderating device communicates with a server managing the conference call.

9. The method of claim 1, wherein the conference call is a conference phone call.

10. A system comprising:
a mobile device comprising:
one or more processors configured to execute modules; and
a memory storing the modules, the modules comprising:
a communication module configured to receive, by the mobile device, a request to participate in a conference call, receive, in connection with receiving the request, a conference call roster providing a plurality of conference call attendees participating on a conference call, and sending a request for contact information of a first conference call attendee of the plurality of conference call attendees, wherein the contact information of the first conference call attendee is stored in a remote contact information database, and wherein one or more conference call attendees can participate on the conference call via a full-duplex communication session;

a contact information retrieving module configured to retrieve, while participating on the conference call, contact information for the first conference call attendee based on a conference call moderating device determining whether to approve the request for the contact information of the first conference call attendee based on a predefined rule, wherein the predefined rule defines one or more types of requests to reject; and a management module configured to populate a contact information record with the retrieved contact information.

11. The system of claim 10, wherein the modules further comprise:
a contact information generation module configured to create the contact information record in the mobile device based on the retrieved contact information of the first conference call attendee.

12. The system of claim 10, further comprising:
a first server associated with the contact information database; and
a second server configured to manage the conference call, the second server being different from the first server.

13. The system of claim 10, wherein the management module is configured to:
receive an instruction from a user to store the populated contact information record in the mobile device.

14. The system of claim 10, wherein the management module is further configured to:
add the contact information record to a group of contacts of the mobile device or to an ad hoc group of contacts of the mobile device.

15. The system of claim 10, wherein the management module is further configured to:
compare the received contact information with first conference call attendee's contact information that was previously stored on the mobile device; and
update the stored contact information of the contact information record based on the comparison.

16. A non-transitory computer-readable medium that stores a set of instructions that are executable by a mobile device to cause the mobile device to perform a method comprising:
receiving, by the mobile device, a request to participate in a conference call;
in connection with receiving the request, receiving a conference call roster providing a plurality of conference call attendees participating on a conference call, wherein one or more conference call attendees can participate on the conference call via a full-duplex communication session;
sending, while the mobile device is participating on the conference call, a request for contact information of a first conference call attendee of the plurality of conference call attendees, wherein the contact information of the first conference call attendee is stored in a remote contact information database;
receiving, while the mobile device is participating on the conference call, contact information for the first conference call attendee based on a conference call moderating device determining whether to approve the request for the contact information of the first conference call attendee based on a predefined rule, wherein the predefined rule defines one or more types of requests to reject; and populating a contact information record with the received contact information.

17. The non-transitory computer-readable medium of claim 16, further comprising instructions executable by the mobile device to cause the mobile device to perform:

creating the contact information record in the mobile device based on the received contact information of the first conference call attendee.

18. The non-transitory computer-readable medium of claim 16, wherein the remote contact information database is associated with a first server, and the conference phone call is managed by a second server different from the first server.

19. The non-transitory computer-readable medium of claim 16, further comprising instructions executable by the mobile device to cause the mobile device to perform:

adding the contact information record to a group of contacts or to an ad hoc group of contacts.

20. The non-transitory computer-readable medium of claim 16, further comprising instructions executable by the mobile device to cause the mobile device to perform:

comparing the received contact information with first conference call attendee's contact information that was previously stored on the mobile device; and updating the stored contact information of the contact information record based on the comparison.

* * * * *